(12) United States Patent
Bohm

(10) Patent No.: US 8,439,778 B2
(45) Date of Patent: May 14, 2013

(54) AXIAL FIXING DEVICE WITH AN INTEGRATED END PLUG

(75) Inventor: Robert Bohm, Mainberg (DE)

(73) Assignee: SRAM Deutschland GmbH (DE)

( * ) Notice: Subject to any disclaimer, the term of this patent is extended or adjusted under 35 U.S.C. 154(b) by 213 days.

(21) Appl. No.: 13/047,703

(22) Filed: Mar. 14, 2011

(65) Prior Publication Data

US 2011/0224036 A1    Sep. 15, 2011

(30) Foreign Application Priority Data

Mar. 12, 2010   (DE) .......................... 10 2010 011 392

(51) Int. Cl.
*F16H 9/00*      (2006.01)
*F16H 59/00*     (2006.01)
*F16H 61/00*     (2006.01)
*F16H 63/00*     (2006.01)

(52) U.S. Cl.
USPC ............................................. 474/80; 474/82

(58) Field of Classification Search ............... 474/80–82
See application file for complete search history.

(56) References Cited

U.S. PATENT DOCUMENTS

| | | | | |
|---|---|---|---|---|
| 3,125,894 A | * | 3/1964 | Juy ............................... | 74/473.1 |
| 4,037,484 A | * | 7/1977 | Morse ............................ | 474/82 |
| 4,055,093 A | * | 10/1977 | Ross .............................. | 74/501.6 |
| 4,267,744 A | * | 5/1981 | Yamasaki .................. | 74/473.13 |
| 4,277,077 A | * | 7/1981 | Ozaki ........................... | 280/236 |
| 4,323,357 A | * | 4/1982 | Nagano ........................... | 474/82 |
| 4,348,198 A | * | 9/1982 | Shimano ......................... | 474/82 |
| 4,406,643 A | * | 9/1983 | Shimano ......................... | 474/82 |
| 4,452,593 A | * | 6/1984 | Coue ............................... | 474/80 |
| 4,469,479 A | * | 9/1984 | Ozaki ............................. | 474/80 |
| 4,530,677 A | * | 7/1985 | Nagano ........................... | 474/80 |
| 4,573,949 A | * | 3/1986 | Nagano ........................... | 474/80 |
| 4,575,365 A | * | 3/1986 | Nagano ........................... | 474/80 |
| 4,601,682 A | * | 7/1986 | Nagano ........................... | 474/80 |
| 4,619,633 A | * | 10/1986 | Nagano ........................... | 474/82 |
| 4,637,809 A | * | 1/1987 | Nagano ........................... | 474/80 |
| 4,670,000 A | * | 6/1987 | Nagano ........................... | 474/80 |
| 4,690,663 A | * | 9/1987 | Nagano ........................... | 474/80 |
| 4,692,131 A | * | 9/1987 | Nagano ........................... | 474/80 |
| 4,838,837 A | * | 6/1989 | Testa .............................. | 474/80 |
| 5,624,335 A | * | 4/1997 | Ando ............................. | 474/80 |
| 5,836,844 A | * | 11/1998 | Yoshida ......................... | 474/80 |
| 6,350,212 B1 | * | 2/2002 | Campagnolo .................. | 474/80 |
| 6,394,921 B1 | * | 5/2002 | Fukuda .......................... | 474/80 |
| 6,447,413 B1 | * | 9/2002 | Turer et al. .................... | 474/80 |
| 7,942,767 B2 | | 5/2011 | Yamaguchi | |
| 7,963,870 B2 | * | 6/2011 | Deguchi et al. ................ | 474/80 |
| 8,109,848 B2 | * | 2/2012 | Bohm et al. .................... | 474/82 |

(Continued)

FOREIGN PATENT DOCUMENTS

| | | |
|---|---|---|
| DE | 3235138 | 5/1983 |
| DE | 3623887 | 12/1989 |
| EP | 1935774 | 5/2010 |
| GB | 2110322 | 6/1983 |
| GB | 2252361 | 8/1992 |

*Primary Examiner* — William A Rivera
*Assistant Examiner* — Henry Liu
(74) *Attorney, Agent, or Firm* — Milan Milosevic; Lisa Serdynski; Steven Courtright

(57) ABSTRACT

An axial fixing and closure member arrangement including an insert element for producing a rotatable, but axially fixed connection between the rotary axle of the chain guide of a rear gear change mechanism for bicycles and the related lower pivot head by means of a spring element, wherein additionally the insert element also has a sealing effect by providing an integrated closure member.

10 Claims, 4 Drawing Sheets

U.S. PATENT DOCUMENTS

| | | | |
|---|---|---|---|
| 8,142,312 B2 * | 3/2012 | Watarai | 474/80 |
| 2002/0065158 A1 * | 5/2002 | Meggiolan | 474/82 |
| 2004/0116222 A1 * | 6/2004 | Shahana et al. | 474/82 |
| 2005/0215368 A1 * | 9/2005 | Hoe | 474/80 |
| 2008/0058136 A1 * | 3/2008 | Muramoto et al. | 474/82 |
| 2009/0275429 A1 * | 11/2009 | Deguchi et al. | 474/80 |

* cited by examiner

AXIAL FIXING DEVICE WITH AN INTEGRATED END PLUG

BACKGROUND OF THE INVENTION

The invention relates to a device for producing a rotatable, but axially fixed connection between a rotary axle of a chain guide of a rear gear change mechanism for bicycles and a related lower pivot head (i.e., a derailleur front knuckle).

Rear gear change mechanisms on bicycles serve to shift the chain between several sprockets mounted on the rear wheel. To this end, these rear gear change mechanisms include a stationary part, a moveable part and a parallelogram mechanism. The stationary part is mounted on the bicycle frame, usually on a rear dropout, and includes, besides an element like a screw for mounting the gear change mechanism on the dropout, an upper pivot head. The essential component of the moveable part is a lower pivot head, which moves jointly with a chain guide. In addition to the function of guiding the chain, the chain guide must make it possible to tension the chain. To this end, the chain guide is mounted on the lower pivot head so that this chain guide can rotate relative to said lower pivot head.

In some cases the corresponding axle is rigidly connected to the chain guide and is accommodated in a borehole on the pivot head. Current designs show a screw connection between the axle and the chain guide, such as in DE 32 35 138. DE 36 23 887 shows how a spring plate engages with a circumferential groove on the axle and secures the axle in its axial position so as to be rotatable relative to the pivot head. In this solution the passage on the lower pivot head, which is provided for mounting the spring plate, is still present following assembly, as a result of which it is still possible for dirt and moisture to penetrate into the interior.

The result is the possibility of a malfunction. If the spring plate is also accessible from the direction opposite the mounting direction, then it can also be disassembled again by exerting a compressive force. Instead of the spring plate, it is also possible to use a pin that is pressed transversely to the axle into a borehole in the lower pivot head. This pin also engages with a circumferential groove on the pivot head, but, in contrast to the solution with a spring plate, has the drawback that an engagement with the axle in the groove is produced only at smaller contact areas, a state that makes the arrangement more sensitive to wear. In addition, the pin cannot be disassembled again or can be disassembled only with great difficulty.

SUMMARY OF THE INVENTION

In accordance with an embodiment of the invention, an aspect of the present invention is to obtain an improvement over the above-described drawbacks with simple means. This is achieved by constructing the spring plate and a closure member as an integral part. Furthermore, providing a handle projection creates optimal conditions for a simple assembly and disassembly.

These as well as other aspects and advantages will become further apparent to those of ordinary skill in the art by reading the following detailed description, with reference where appropriate to the accompanying drawings.

DETAILED DESCRIPTION

Figure 1:
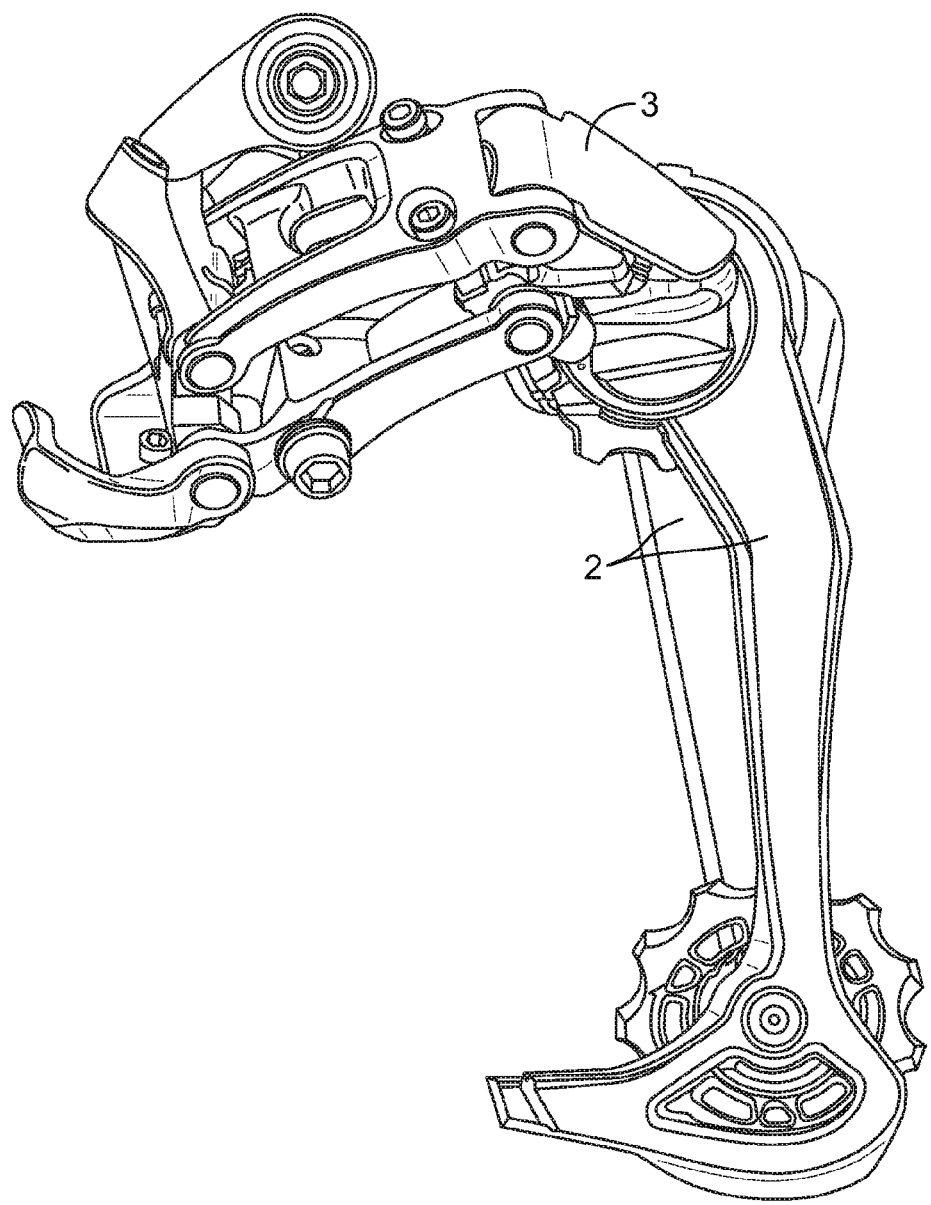
FIG. 1 shows a typical rear gear change mechanism that is intended for a bicycle and that uses the axial fixing and closure member arrangement according to an embodiment of the invention.

FIG. 1 shows a typical rear gear change mechanism that is intended for a bicycle and that uses the axial fixing and closure member arrangement according to an embodiment of the invention, wherein the relationship between chain guide 2 and lower pivot head 3 is shown.

Figure 2:
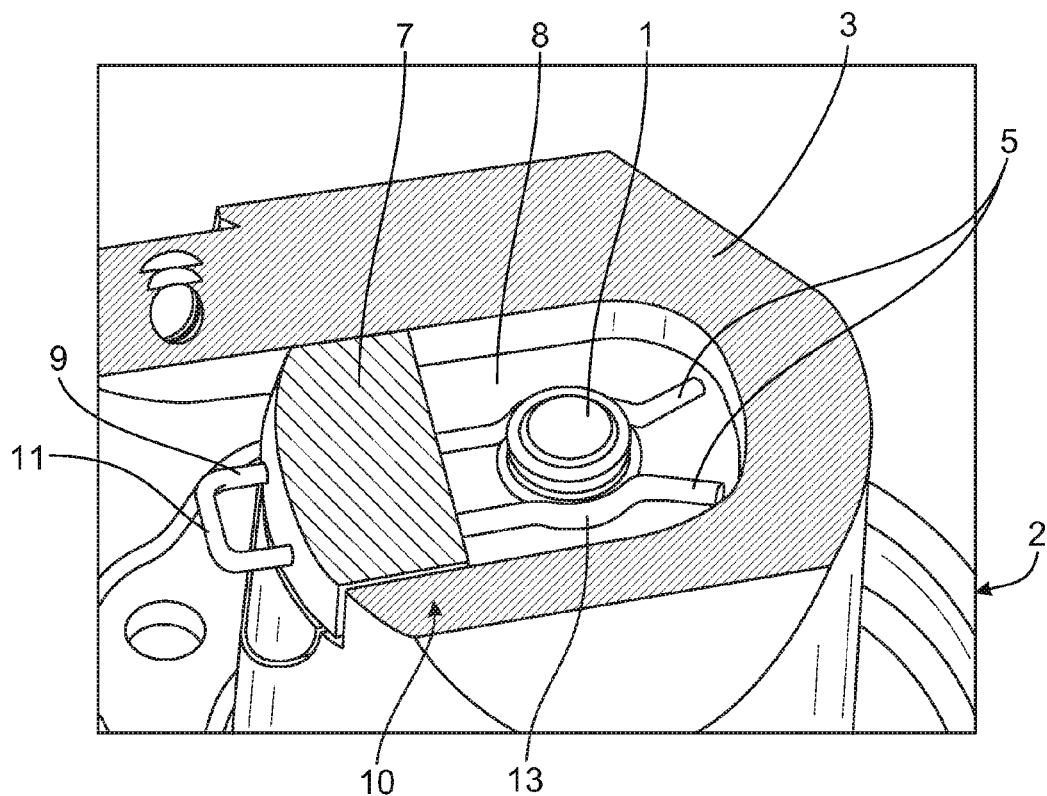
FIG. 2 shows an axial fixing and closure member arrangement in a sectional view extending transversely to the axle in the lower pivot head according to the invention.

FIG. 2 is a sectional view of the lower pivot head 3 of a rear bicycle gear change mechanism transversely to the axle 1, as a result of which it is possible to see an opening 8 extending transversely to the axle. This opening 8 shows very clearly the insert element 10, which is formed by the spring element 4 and the closure member 7. This insert element is inserted into the opening 8 in a direction transversely to the axle 1 and can be removed again from the opening 8. In the inserted state the locking regions 13 on the spring arms 5 of the spring element 4 envelop the axle 1 in a groove 6. It is necessary to apply an actuating force, in order to move from this locked-in state into an unlocked state. In order to introduce the actuating force that in this case is a pull force, the insert element 10 has a handle projection 9 formed by center section 11, for example, for convenient insertion and removal of the insert element. It will be understood that the handle can take any useful form to perform the function of insertion and removal of the insert element.

Figure 3:
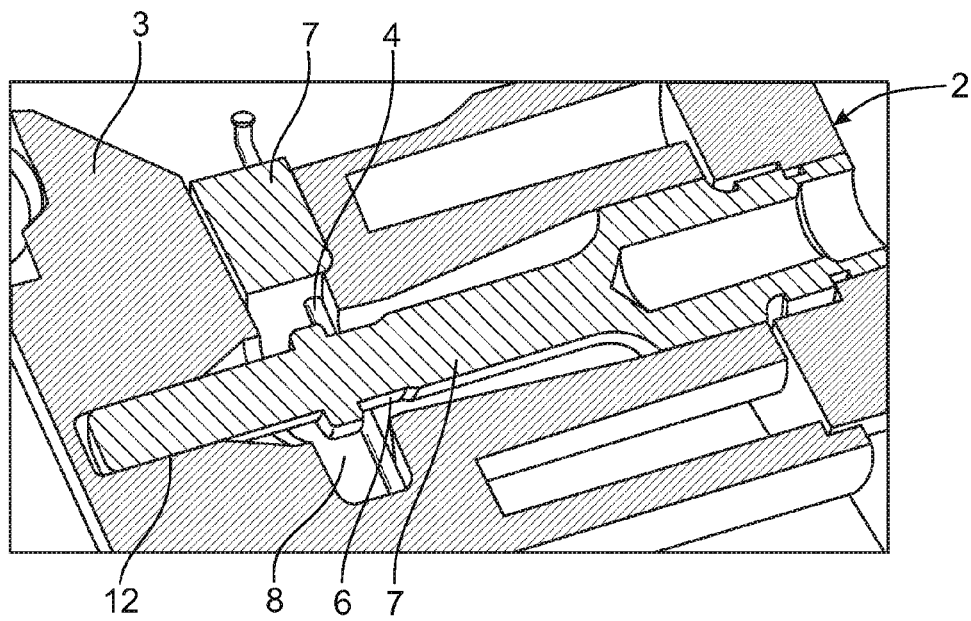
FIG. 3 shows an axial fixing and closure member arrangement in a sectional view extending longitudinally to the axle in the lower pivot head.

FIG. 3 shows that the width of the groove is greater than the diameter of the spring arms 5, as a result of which the axle 1 at the spring arm 5 is secured only in one axial direction with the effect of a stop. Therefore, the relative movement of the axle 1 relative to the lower pivot head 3 is restricted by the fact that the axle strikes against the base of the borehole 12 in the lower pivot head 3.

Since the groove 6 on the axle 1 is circular, the axle 1 can rotate relative to the insert element 10, so that there are no additional resistive forces, save for the frictional forces. The closure member 7 closes the opening 8 towards the outside and prevents the penetration of moisture and dirt and, in so doing, protects the components accommodated in the interior of the lower pivot head 3. In particular, the axle 1 is protected against corrosion.

In order to ensure that during the assembly and disassembly operations the locking regions 13 of the spring arms 5 will always snap open at the same time that the closure member 7 closes the opening 8, the closure member should be mounted in a non-displaceable manner on the spring arms 5. This goal is achieved by the fact that the spring arms 5 do not have a parallel course or that the wire exhibits in its longitudinal course cross-sectional transitions.

Figure 4:
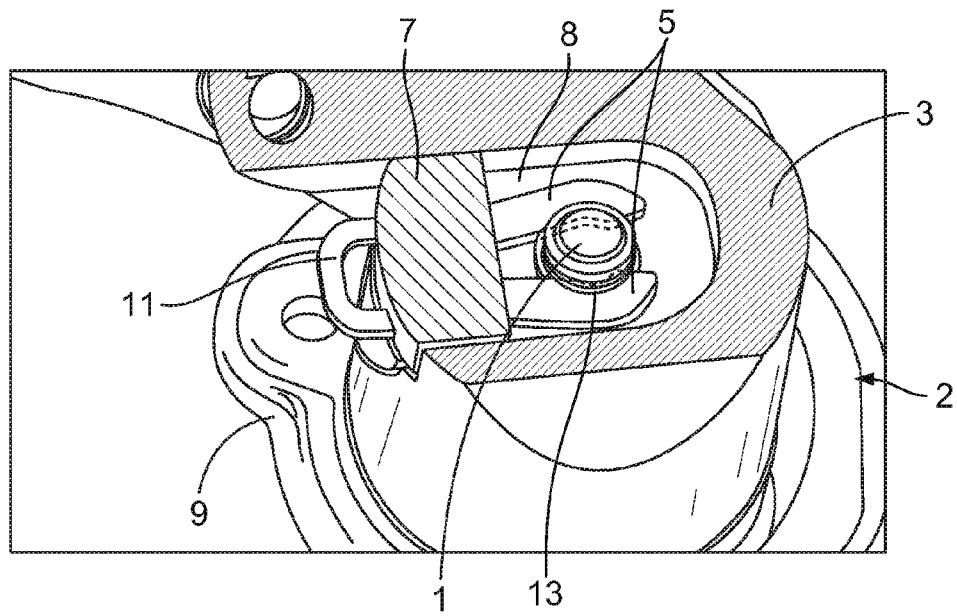
FIG. 4 shows a first alternative embodiment of the axial fixing and closure member arrangement in a sectional view extending transversely to the axle in the lower pivot head.
Figure 5:
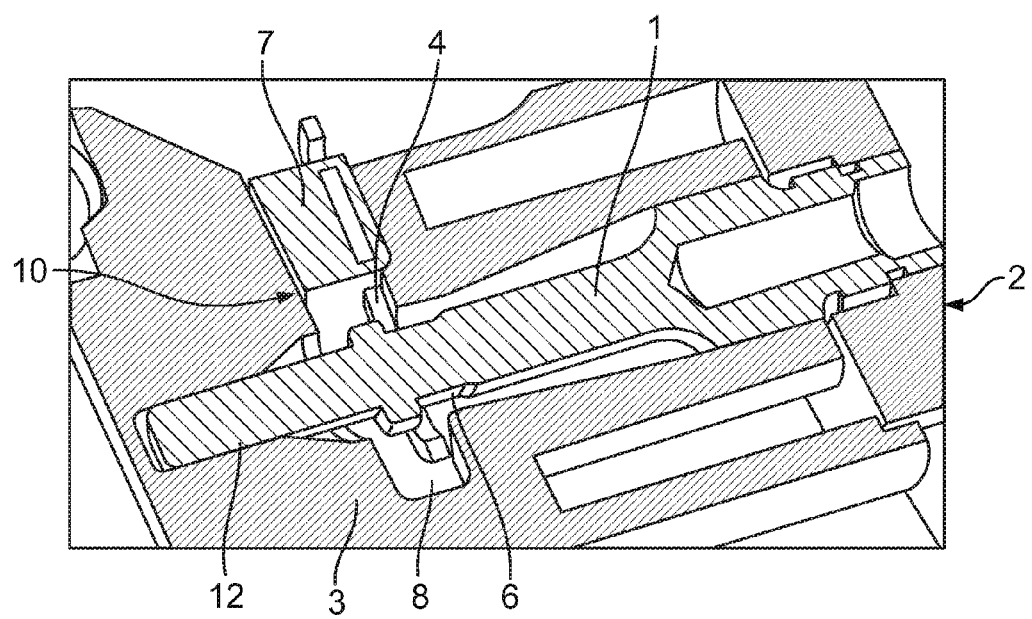
FIG. 5 shows the axial fixing and closure member arrangement, according to FIG. 4, in a sectional view extending longitudinally to the axle in the lower pivot head.

FIGS. 4 and 5 show an insert element 10, where the spring arms 5 and the handle projection 9 are made of a metal sheet. This embodiment solves the displacement of the closure member on the spring arms 5 by their shape that allows the section of the closure member 7 to completely envelop the spring arm sections.

Figure 6:
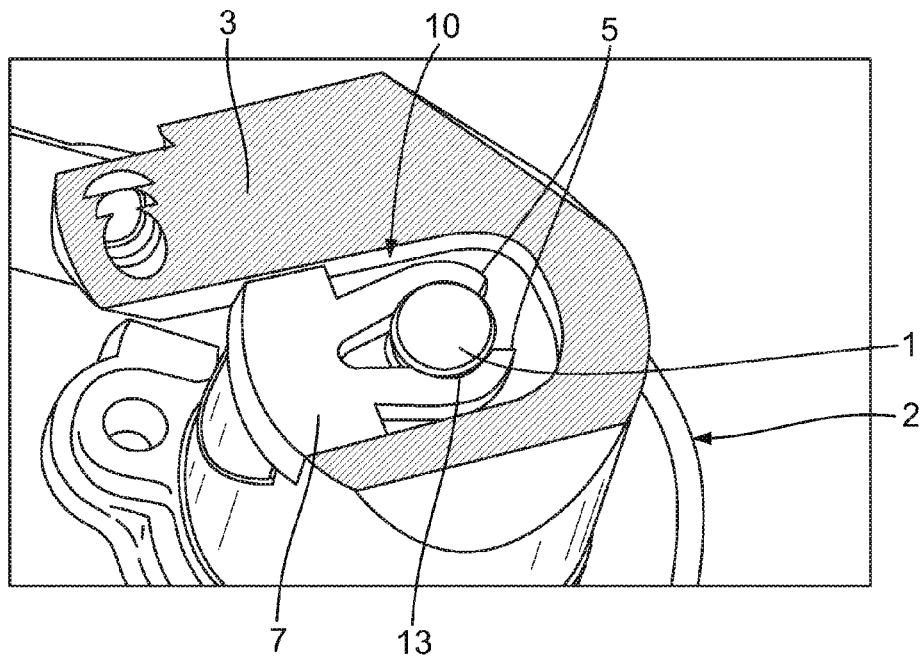
FIG. 6 shows a second alternative embodiment of the axial fixing and closure member arrangement in a sectional view extending transversely to the axle in the lower pivot head.
Figure 7:
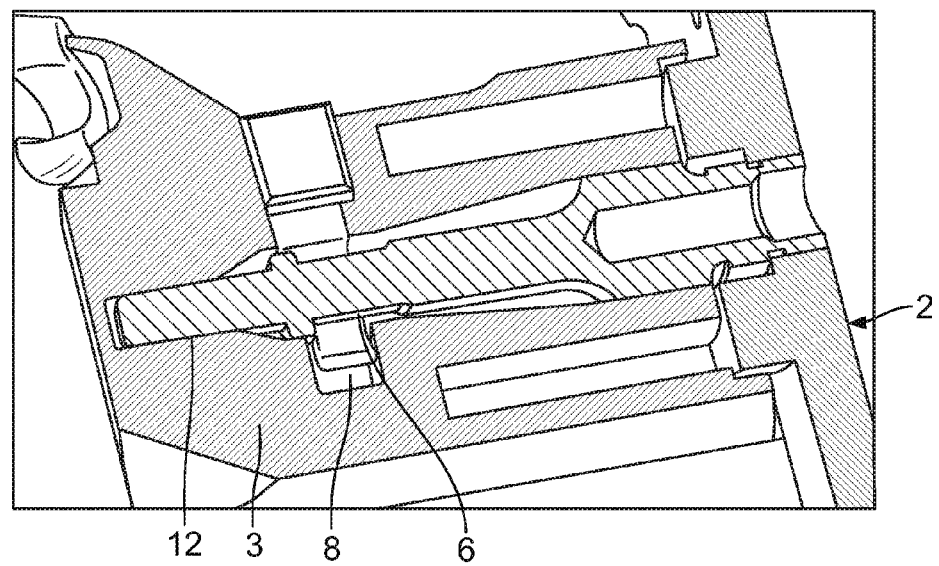
FIG. 7 shows the axial fixing and closure member arrangement, according to FIG. 6, in a sectional view extending longitudinally to the axle in the lower pivot head.

FIGS. 6 and 7 show an insert element 10 that is made totally of a synthetic plastic material. This embodiment has no problems with connecting together the metal components of the spring element 4 and the closure member 7 that is made of a synthetic plastic material. The synthetic plastic material that is used has to satisfy more stringent requirements, because it must be both adequately flexible to seal the opening 8 and, on the other hand, adequately stiff so that the spring arms 5 can generate an adequately high spring force and that the pressure per unit of area on the locking region 13 with the groove 6 is tolerable. Another requirement would follow from an existing handle projection; and, for this reason it was intentionally omitted in the embodiment that is made of a synthetic plastic material.

It should be understood that the illustrated embodiments are examples only and should not be taken as limiting the scope of the present invention. The claims should not be read as limited to the described order or elements unless stated to that effect. Therefore, all embodiments that come within the scope and spirit of the following claims and equivalents thereto are claimed as the invention.

What is claimed is:

1. An axial fixing and closure member arrangement on an axle of a chain guide in a lower pivot head of a bicycle rear derailleur, wherein the axle is held in a rotatable and axially non-displaceable manner relative to the lower pivot head; comprising
    a spring element received in an opening that extends transversely to the axle in the lower pivot head, and two spring arms that engage with a circumferential groove on the axle of the chain guide in order to axially secure the axle relative to the lower pivot head; and
    a closure member that is shaped and sized to close the opening; wherein the spring element and the closure member form an integrated insert element, which is mounted on the lower pivot head, the spring element securing the axle relative to the lower pivot head in its position in the direction of its longitudinal stretch, the closure member can be removably inserted into the opening.

2. The axial fixing and closure member arrangement, according to claim 1, wherein the insert element has a handle projection.

3. The axial fixing and closure member arrangement, according to claim 1, wherein the spring element is made of a metal wire.

4. The axial fixing and closure member arrangement, according to claim 1, wherein the handle projection is formed by a center section of the spring element that is disposed between the two spring arms.

5. The axial fixing and closure member arrangement, according to claim 1, wherein the spring element is made of a resilient plastic material.

6. The axial fixing and closure member arrangement, according to claim 1, wherein the axle forms with the base of a borehole in the lower pivot head a stop in the axial direction of the axle, while the stop in the opposite direction is formed by a limiting boundary of the groove in connection with the spring arm of the spring element.

7. The axial fixing and closure member arrangement, according to claim 1, wherein the spring element is made of a flat metal material.

8. The axial fixing and closure member arrangement, according to claim 7, wherein the closure member is secured with respect to a displacement relative to the spring element by at least one section that completely envelops the spring arm.

9. The axial fixing and closure member arrangement, according to claim 3, wherein the closure member is secured with respect to a displacement relative to the metal wire of the spring element by the fact that the spring arms in the region of the closure member do not have a completely parallel course or that the wire has cross sectional transitions in its longitudinal course.

10. The axial fixing and closure member arrangement, according to claim 4, wherein the closure member is secured with respect to a displacement relative to the metal wire of the spring element by the fact that the spring arms in the region of the closure member do not have a completely parallel course or that the wire has cross sectional transitions in its longitudinal course.

* * * * *